United States Patent
Brück

(10) Patent No.: US 8,701,391 B2
(45) Date of Patent: Apr. 22, 2014

(54) METHOD FOR OPERATING AN EXHAUST-GAS SYSTEM WITH LAMBDA CONTROL AND MOTOR VEHICLE HAVING THE SYSTEM

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 175 days.

(21) Appl. No.: 13/018,792

(22) Filed: Feb. 1, 2011

(65) Prior Publication Data
US 2011/0167802 A1 Jul. 14, 2011

(30) Foreign Application Priority Data
Aug. 1, 2008 (DE) .......................... 10 2008 036 127

(51) Int. Cl.
*F01N 3/035* (2006.01)
*F02D 43/00* (2006.01)

(52) U.S. Cl.
USPC .................................. 60/295; 60/287; 60/285

(58) Field of Classification Search
USPC ........................................... 60/274, 285, 295
See application file for complete search history.

(56) References Cited

U.S. PATENT DOCUMENTS

| 4,251,989 A * | 2/1981 | Norimatsu et al. | 60/276 |
| 5,848,529 A * | 12/1998 | Katoh et al. | 60/274 |
| 5,908,480 A * | 6/1999 | Ban et al. | 55/482 |
| 7,207,171 B2 * | 4/2007 | Nagaoka et al. | 60/295 |
| 2004/0177605 A1 * | 9/2004 | Kojima et al. | 60/274 |
| 2004/0194450 A1 | 10/2004 | Tanaka et al. | |
| 2005/0050884 A1 | 3/2005 | Nagaoka et al. | |
| 2005/0072141 A1 | 4/2005 | Kitahara | |
| 2006/0213188 A1 * | 9/2006 | Matsuno et al. | 60/286 |
| 2007/0014710 A1 * | 1/2007 | Gerlach et al. | 423/213.5 |

FOREIGN PATENT DOCUMENTS

| CN | 1590727 A | 3/2005 |
| DE | 198 01 815 A1 | 7/1999 |
| DE | 10 2004 019 660 A1 | 1/2005 |
| DE | 102004019660 A1 | 1/2005 |
| DE | 102005062398 A1 | 6/2007 |
| EP | 1418316 A1 | 5/2004 |
| EP | 1 510 671 A2 | 3/2005 |

(Continued)

OTHER PUBLICATIONS

International Search Report of PCT/EP2009/058179 Dated Aug. 28, 2009.

*Primary Examiner* — Kenneth Bomberg
*Assistant Examiner* — Brandon Lee
(74) *Attorney, Agent, or Firm* — Laurence A. Greenberg; Werner H. Stemer; Ralph E. Locher

(57) ABSTRACT

A method for operating an exhaust-gas system of an internal combustion engine having at least one particle separator and a catalytic converter, includes at least the following steps: a) carrying out processes in the internal combustion engine with lambda control about a control value; b) identifying a regeneration process of the particle separator; c) determining an oxygen demand for the regeneration process of the particle separator; and d) adapting the lambda control by the defined oxygen demand for a time period of the regeneration process of the particle separator. A motor vehicle having a spark-ignition engine and being suitable for carrying out the method, is also provided.

9 Claims, 2 Drawing Sheets

(56) References Cited

FOREIGN PATENT DOCUMENTS

| | | |
|---|---|---|
| EP | 2 063 090 A1 | 5/2009 |
| FR | 2 829 526 A1 | 3/2003 |
| JP | 2004036552 A | 2/2004 |
| JP | 2006242072 A | 9/2006 |
| JP | 2009215933 A | 9/2009 |

* cited by examiner

METHOD FOR OPERATING AN EXHAUST-GAS SYSTEM WITH LAMBDA CONTROL AND MOTOR VEHICLE HAVING THE SYSTEM

CROSS-REFERENCE TO RELATED APPLICATION

This is a continuation, under 35 U.S.C. §120, of copending International Application No. PCT/EP2009/058179, filed Jun. 30, 2009, which designated the United States; this application also claims the priority, under 35 U.S.C. §119, of German Patent Application DE 10 2008 036 127.5, filed Aug. 1, 2008; the prior applications are herewith incorporated by reference in their entirety.

BACKGROUND OF THE INVENTION

Field of the Invention

The present invention relates to a method for operating an exhaust system of an internal combustion engine, in which at least one particle separator and a catalytic converter are disposed in the exhaust system. The invention also relates to a motor vehicle which is suitable for carrying out the method. The invention is used, in particular, in conjunction with the regeneration of particle separators during operation of the internal combustion engine.

Problems can arise in the removal of solid combustion residues, specifically in connection with the treatment of exhaust gases from spark-ignition internal combustion engines. It has heretofore been found, in the exhaust-gas treatment of spark-ignition engines, that in terms of mass, considerably fewer particles are produced in the exhaust gas than is the case in diesel engines. In order to remove those soot particles, use is made, for example, of a particle separator (wall flow filter, partial flow filter, etc.) in which the particles are retained. In order to prevent a blockage and/or to obtain an increase in effectiveness of the particle separator again, the soot is converted thermally, for example at a temperature of 550° to 600° C., for which purpose oxygen is required.

A so-called lambda control is usually used for spark-ignition engines. Such a lambda control serves, in particular, to adapt the combustion processes in the internal combustion engine with regard to power and specific fuel consumption. Lambda ($\lambda$) refers to the air/fuel ratio in relation to a stoichiometric mixture. A stoichiometric mixture contains exactly the air quantity required to burn the fuel completely. That is referred to as $\lambda=1.0$. In that case, the mass ratio is 14.7:1 in the case of gasoline. If more fuel is present, it is referred to as a rich mixture ($\lambda<1$), and in the case of an excess of air, it is referred to as a lean mixture ($\lambda>1$). In lambda control, the actual lambda value is measured through the use of suitable sensors and the fuel quantity or air quantity is varied in such a way that the lambda control value is set.

In exhaust systems having a three-way catalytic converter, the lambda control is set up so as to adhere precisely to the control value 1.0. Two different variants are known for that purpose, specifically firstly a variant in which the lambda value is held constant at exactly 1.0, and a variant in which a constant oscillation of the actual lambda value about the lambda mean value 1.0 is carried out. In that way, the exhaust-gas is provided with a composition at which a conversion of the pollutants still contained therein, which is as effective as possible, is obtained upon contact with the three-way catalytic converter.

SUMMARY OF THE INVENTION

It is accordingly an object of the invention to provide a method for operating an exhaust-gas system with lambda control and a motor vehicle having the system, which overcome the hereinafore-mentioned disadvantages and at least partially solve the highlighted problems of the heretofore-known methods and vehicles of this general type. In particular, it is sought to specify a method with which a more effective conversion of pollutants and/or particles from the exhaust-gas flow of an internal combustion engine during operation can be obtained. Furthermore, it is sought to specify a motor vehicle having an exhaust system with which controlled regulation of the regeneration of the particle filter can be realized, with gaseous constituents still likewise being reliably and effectively converted.

With the foregoing and other objects in view there is provided, in accordance with the invention, a method for operating an exhaust system of an internal combustion engine, in which the exhaust system has at least one particle separator and a catalytic converter. The method comprises:
 a) carrying out processes in the internal combustion engine with lambda control about a control value;
 b) identifying a regeneration process of the at least one particle separator;
 c) determining an oxygen demand for the regeneration process of the at least one particle separator; and
 d) adapting the lambda control for the determined oxygen demand during a period of the regeneration process of the at least one particle separator.

Step a) means, in particular, that the supply of air and fuel to the internal combustion engine takes place as a function of the lambda value. In this case, a predominantly constant control value is generally predefined for the operation of the internal combustion engine.

The identification of a regeneration process of the particle separator according to step b) may be determined by measurement and/or by calculation. It is possible, for example, for the pressure drop across the particle separator to be measured and/or calculated. It is also possible for a mathematical model to be provided, from which the stored quantity of particles can be determined or calculated as a function of the processes in the internal combustion engine. In any case, a limit value is taken into consideration in this case, and a regeneration of the particle separator is initiated when that limit value is reached. The limit value may be fixed, although it is also possible in this case to provide a limit value which is variable according to the load situation of the internal combustion engine and/or the temperatures in the exhaust system.

In step c), it is then determined how much oxygen is required in the exhaust gas solely for the oxidation of the particles in the particle separator. For this purpose, consideration may be given, in particular, to various boundary conditions such as, for example, the temperature of the exhaust gas, the flow speed of the exhaust gas, the temperature in the particle separator, the mass and/or size and/or distribution of the particles in the particle separator, etc. In this case, the oxygen demand is either determined on the basis of concrete measured values and/or if appropriate calculated by using suitable models.

The lambda control is then adapted as a function of the oxygen demand thus determined, in such a way that, in particular, more air (respectively oxygen) is supplied in order to add the determined (if possible only precisely the required) oxygen demand to the exhaust gas. Therefore, for the period of the regeneration process of the particle separator, an amount of additional oxygen is supplied which is such that firstly the regeneration of the particle separator takes place with the desired conversion rate, but secondly also the catalytic converter performs conversion in an exhaust gas environment in which it is effective.

In accordance with another mode of the invention, in this connection, it is preferable for the control value in step a) to be a lambda value of 1.0. In this respect, the method is suitable, in particular, for controlling the combustion processes in a spark-ignition engine in such a way that a three-way catalytic converter positioned in the exhaust system operates in its optimum environment even during the regeneration process of the particle separator.

In accordance with a further mode of the invention, in one refinement, it is also proposed that the control value in step d) be a lambda value in a range of from 1.02 to 1.05. The lambda value range proposed in this case is oriented exactly to the oxygen demand for the regeneration process of the particle separator and should preferably be adhered to for the entire period of the regeneration process. In this respect, it is proposed in this case, in particular, that the (averaged) lambda value be shifted in the lean direction as a function of the driving performance and determined temperatures.

In accordance with an added mode of the invention, in addition to the increase in average value of the lambda value for the period of the regeneration process of the particle separator, it is also proposed that the control value in step a) be varied about a lambda value of 1.0 with a first amplitude and, in step d), a second amplitude be set which is greater than the first amplitude. In this way, an increased oxygen fraction is provided in the exhaust gas at least periodically during the period of the regeneration process, in such a way that in this case, too, the soot can be reliably converted. The difference in amplitudes is preferably 2 to 10%, in particular 3 to 6%.

In accordance with an additional mode of the invention, in one refinement of the invention, it is also proposed that the determination of an oxygen demand be calculated on the basis of a regeneration model of the particle filter. This means in particular that, taking into consideration the combustion processes, the temperature etc., or independently of these, the identification of a regeneration process of the particle separator, takes place from a regeneration model. The regeneration model may contain empirical values and/or parameters from which the need for a regeneration process of the particle separator can be identified.

In accordance with yet another mode of the invention, the method is carried out in particular when, during step d), a temperature of at least 500° C. is present in the region of the particle separator. The temperature in the region of the particle separator may refer to the temperature of the particle separator itself and sections of the exhaust system situated upstream and/or downstream, or the temperature of the inflowing or outflowing exhaust gas. For this purpose, use may be made, in particular, of temperature sensors and/or temperature models for the mathematical determination of the temperature.

With the objects of the invention in view, there is also provided a motor vehicle, comprising a spark-ignition engine, an exhaust system connected to the spark-ignition engine for conducting a flow of exhaust gas produced in the spark-ignition engine through the exhaust system in a flow direction, at least one sensor disposed in the exhaust system, at least one particle separator and a three-way catalytic converter disposed in series in the flow direction in the exhaust system, and an electronic controller for the spark-ignition engine interacting with the at least one sensor and configured to carry out the method according to the invention described herein.

For completeness, it is pointed out that further components for exhaust-gas aftertreatment may also be provided in addition to the particle separator and three-way catalytic converter. It is relevant in this case that the particle separator is disposed upstream of the three-way catalytic converter, that is to say the exhaust gas first makes contact with the particle separator before passing to the three-way catalytic converter. Accordingly, further exhaust-gas treatment units may also be provided between the particle separator and the three-way catalytic converter. The electronic controller may, in particular, be the engine controller of the motor vehicle, wherein the engine controller may also be integrated into an on-board system of the motor vehicle. In any case, the signals or data from the sensors can be processed, and if appropriate also compared or correlated with mathematical models, in the electronic controller.

In accordance with another feature of the invention, in a motor vehicle of this type, it is considered to be advantageous for a first lambda probe to be disposed upstream of the particle separator in the flow direction and for at least one second lambda probe to be disposed downstream of the particle separator or downstream of the three-way catalytic converter. It is also possible, if appropriate, for at least one of the lambda probes mentioned in this case to be integrated in the particle separator or in the three-way catalytic converter. In this case, the lambda probes are sensors of the exhaust system. The lambda probes may, in particular, be used to establish when the regeneration process of the particle filter has substantially come to an end, with the lambda probe disposed downstream of the particle separator being used for this purpose. In this respect, it is possible in this way to determine the period of the regeneration process of the particle filter and to thereby initiate the end of step d).

In accordance with a concomitant feature of the invention, the particle separator of the motor vehicle is preferably formed with a honeycomb body which has open channels delimited by a metallic foil and a wire nonwoven. The particle separator proposed in this case is accordingly not a so-called wall-flow filter with alternately closed-off channels, but rather is an open structure, also referred to in other applications by the corporate assignee of the instant application as a "partial flow filter." In a particle separator of this type, the honeycomb body has a multiplicity of channels, which in turn can basically be traversed by the flow of exhaust gas. Guide blades, elevations and the like, which are provided in the channels, deflect the particles toward the wall section with the wire nonwoven, in which case it is always ensured that at least a part of the exhaust gas flowing through the channel can also flow past the guide blades, elevations, etc. and consequently remain in the channel. For this purpose, the metallic foil is preferably formed with a corrugated structure, and for this purpose, the metallic wire nonwoven includes one or more layers of super-fine wires which are disposed relative to one another and which are sintered with and/or welded to one another. If appropriate, the foil and/or the nonwoven may be formed with a (catalytically active) coating.

Other features which are considered as characteristic for the invention are set forth in the appended claims, noting that the features specified individually in the claims may be combined with one another in any desired technologically meaningful way and form further embodiments of the invention.

Although the invention is illustrated and described herein as embodied in a method for operating an exhaust-gas system with lambda control and a motor vehicle having the system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
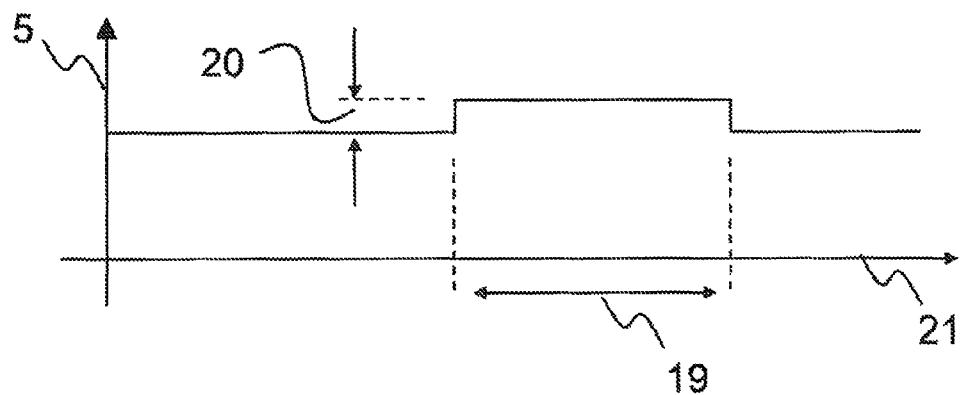
FIG. 1 is a diagram used to explain a first structural variant of the method according to the invention.

Referring now in detail to the figures of the drawing for explaining the invention and the technical field in more detail by showing particularly preferred structural variants to which the invention is not restricted, and first, particularly, to FIG. 1 thereof, there is seen a diagram, in which a control value 5 of a lambda control is plotted on the y axis, during operation of an exhaust system. In this case, the profile of the lambda value is plotted as the control value 5 against time 21. Proceeding from the left, it can be seen that the processes in the internal combustion engine are firstly carried out with a constant control value 5, for example a lambda value of 1.0. If a regeneration process of a particle filter is now identified, a required oxygen demand is determined. The lambda control is then adapted by a certain oxygen demand 20, in such a way that in this case, the control value 5 is increased stepwise over a regeneration period 19. In the regeneration period 19, the control value 5 has a value of 1.02 to 1.05. If an end of the regeneration process of the particle separator is detected, the control value 5 falls back to its original control value.

Figure 2:
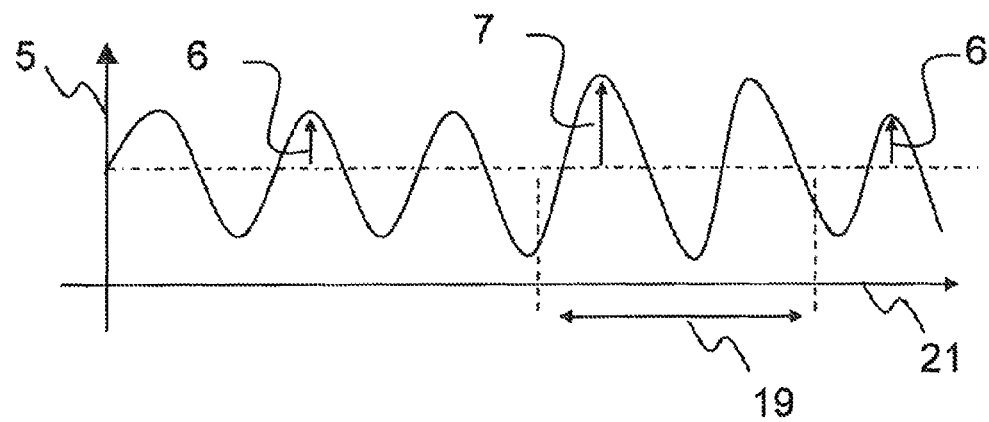
FIG. 2 is a diagram used to explain a second structural variant of the method according to the invention.

FIG. 2 shows a similar situation, wherein in this case, the internal combustion engine is operated with dynamic lambda amplitude control. In this case, too, the control value 5 is plotted versus the time 21. Proceeding from the left, it can be seen that the control value 5 is a mean value, indicated herein as a dash-dotted line, with a first amplitude 6. The lambda control is now adapted for the regeneration period 19 in such a way that a second amplitude 7 is greater than the first amplitude 6. The previously determined oxygen demand is additionally provided in this way. After the end of the regeneration period of the particle separator, the amplitude falls back to the value of the first amplitude 6.

Figure 3:
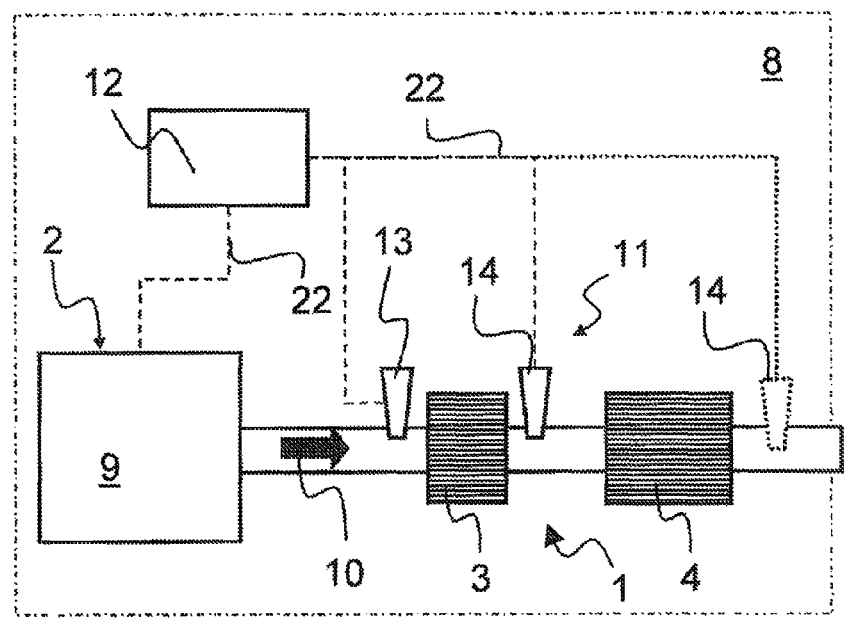
FIG. 3 is a diagrammatic, plan view of a structural variant of a motor vehicle for carrying out the method.

FIG. 3 diagrammatically shows a motor vehicle 8 having an internal combustion engine 2 in the form of a spark-ignition engine 9. An exhaust system 1 is connected to the spark-ignition engine 9. The exhaust gas produced in the spark ignition engine flows in a flow direction 10 firstly through a particle separator 3 and subsequently through a three-way catalytic converter 4. A first lambda probe 13 is provided upstream of the particle separator 3 in the flow direction 10. A second lambda probe 14 is positioned directly downstream of the particle separator 3. FIG. 3, however, also indicates a position of the second lambda probe 14 downstream of the three-way catalytic converter 4 as viewed in the flow direction 10. The motor vehicle 8 also has an electronic controller 12. The electronic controller 12 is respectively connected in data-transmitting and signal-transmitting fashion and/or in terms of control through lines 22 to parts of the internal combustion engine 2 and to the sensors 11. In particular, exhaust-gas characteristic values measured through the use of the sensors 11 can be used for influencing processes in the internal combustion engine 2 through the use of the electronic controller 12.

Figure 4:
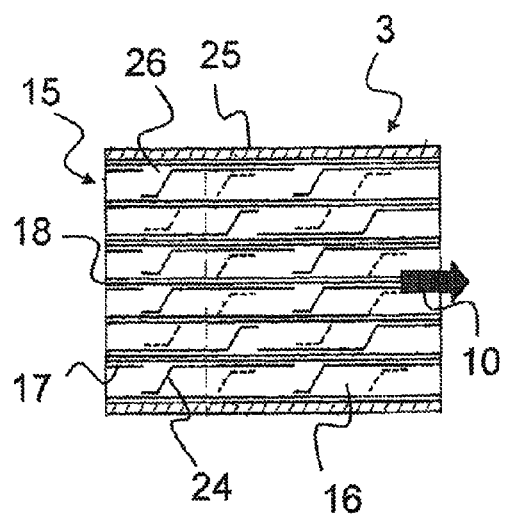
FIG. 4 is an enlarged, longitudinal-sectional view of an open particle separator.

FIG. 4 shows a longitudinal-sectional view of a possible construction variant of a particle separator 3 in the form of a partial flow filter with open channels 16. The channels 16 are each delimited at one side through the use of a respective metallic foil 17 and at the other side through the use of a respective wire nonwoven 18. The exhaust gas with the particles, as it flows through the particle separator 3 in the flow direction 10, is diverted toward the wire nonwoven 18 due to guide surfaces 24 and/or openings 26, in such a way that the exhaust gas flows partially along the wire nonwoven 18 and/or through the wire nonwoven 18. The particles are thereby retained. In an open particle separator 3 of this type, there is no risk of the individual channels 16 becoming blocked, because a bypass flow or partial flow past the guide surfaces 24 of the channels 10 is always possible. For this reason, a regeneration need only be carried out relatively rarely. All of the components of a particle separator 3 of this type are usually composed of metal, so that the particle separator is formed with a metallic housing 25 and a fully metal honeycomb body 15.

Figure 5:
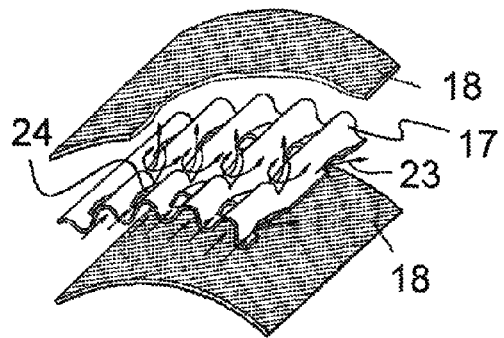
FIG. 5 is a further enlarged, fragmentary, perspective view of a further open particle separator.

FIG. 5 is a fragmentary, diagrammatic view showing the deflection of individual exhaust-gas flows 23 as a result of the structured metallic foil 17 which has the guide surfaces 24. As a result of these guide surfaces 24, at least a part of the exhaust gases is conducted or guided toward the metallic wire nonwovens 18 and the flows are further assisted, in particular, due to pressure differences in adjacent channels.

The invention claimed is:

1. A method for operating an internal combustion engine exhaust system having at least one particle separator and a catalytic converter, the method comprising the following steps:
   providing the internal combustion engine as a spark-ignition engine;
   providing the catalytic converter as a three-way catalytic converter and disposing the at least one particle separator upstream of the three-way catalytic converter in a flow direction of the exhaust system;
   a) carrying out processes in the internal combustion engine with a lambda control about a control value;
   b) identifying a regeneration process of the at least one particle separator;
   c) determining a required oxygen demand for the regeneration process of the at least one particle separator by determining the required oxygen demand as an amount of oxygen required in the exhaust gas solely for the oxidation of particles in the at least one particle separator; and
   d) adapting the lambda control to a lambda value in a range of from 1.02 to 1.05 for providing sufficient oxygen for the determined oxygen demand during a period of the regeneration process of the at least one particle separator such that more air is supplied than in the lambda control in step a) in order to add only precisely the required oxygen demand to the exhaust gas.

2. The method according to claim 1, which further comprises providing the control value in step a) as a lambda value of 1.0.

3. The method according to claim 1, which further comprises:
varying the control value in step a) about a lambda value of 1.0 with a first amplitude; and
setting a second amplitude in step d) being greater than the first amplitude.

4. The method according to claim 1, which further comprises calculating the determination of the oxygen demand based on a regeneration model of the at least one particle separator.

5. The method according to claim 1, wherein a temperature of at least 500° C. is present in vicinity of the at least one particle separator during step d).

6. A motor vehicle, comprising:
a spark-ignition engine;
an exhaust system connected to said spark-ignition engine for conducting a flow of exhaust gas produced in said spark-ignition engine through said exhaust system in a flow direction;
at least one sensor disposed in said exhaust system;
at least one particle separator and a three-way catalytic converter disposed in series in said flow direction in said exhaust system and said at least one particle separator being disposed upstream of said three-way catalytic converter with respect to said flow direction; and
an electronic controller interacting with said at least one sensor, and said electronic controller configured to:
a) carry out processes in said spark-ignition engine with a lambda control about a control value;
b) identify a regeneration process of said at least one particle separator;
c) determine a required oxygen demand for the regeneration process of said at least one particle separator by determining the required oxygen demand as an amount of oxygen required in the exhaust gas solely for the oxidation of particles in said at least one particle separator; and
d) adapt the lambda control to a lambda value in a range of from 1.02 to 1.05 to provide oxygen sufficient oxygen for the determined oxygen demand during a period of the regeneration process of the at least one particle separator such that more air is supplied than in the lambda control in step a) in order to add only precisely the required oxygen demand to the exhaust gas.

7. The motor vehicle according to claim 6, which further comprises a first lambda probe disposed upstream of said at least one particle separator and at least one second lambda probe disposed downstream of said at least one particle separator or downstream of said three-way catalytic converter, in said flow direction.

8. The motor vehicle according to claim 6, wherein said at least one particle separator includes a honeycomb body having a metallic foil and a wire nonwoven delimiting open channels.

9. The motor vehicle according to claim 7, wherein said at least one particle separator includes a honeycomb body having a metallic foil and a wire nonwoven delimiting open channels.

* * * * *